United States Patent [19]

Gooding

[11] Patent Number: 4,819,897

[45] Date of Patent: Apr. 11, 1989

[54] ANTI-CHAFE SUPPORTING OF FLEXIBLE TUBULAR ARTICLES

[76] Inventor: Robert J. Gooding, R.D. 2, Chester Springs, Pa. 19425

[21] Appl. No.: 84,287

[22] Filed: Aug. 11, 1987

Related U.S. Application Data

[63] Continuation-in-part of Ser. No. 852,294, Apr. 15, 1986, abandoned.

[51] Int. Cl.$^4$ .......................... F16L 3/22; B23P 11/00
[52] U.S. Cl. .................................... 248/68.1; 29/434; 29/525.1; 137/355.17; 174/146; 248/49; 280/421
[58] Field of Search .................................. 29/434, 437; 137/355.17, 344; 248/68.1, 55, 70, 49, 74.1, 74.2, 154, 309.1, 311.2, 316.1; 174/146, 147, 157, 138 G, 138 D; 280/421

[56] References Cited

U.S. PATENT DOCUMENTS

| | | | |
|---|---|---|---|
| 460,952 | 10/1891 | Converse | 29/437 UX |
| 2,977,405 | 3/1961 | Warnock | 174/146 X |
| 3,722,916 | 3/1973 | Muntjanoff | 280/421 |
| 3,802,654 | 4/1974 | Jenko et al. | 248/68.1 X |
| 3,872,881 | 3/1975 | Miller et al. | 248/68.1 X |
| 3,885,816 | 5/1975 | Miller et al. | 137/355.17 X |
| 4,034,874 | 7/1977 | Collins | 248/68.1 X |

FOREIGN PATENT DOCUMENTS

| | | | |
|---|---|---|---|
| 827743 | 2/1960 | United Kingdom | 174/146 |
| 893448 | 4/1962 | United Kingdom | 248/68.1 |
| 1192700 | 5/1970 | United Kingdom | 248/70 |
| 1530284 | 10/1978 | United Kingdom | 248/55 |

Primary Examiner—Charlie T. Moon
Attorney, Agent, or Firm—Charles A. McClure

[57] ABSTRACT

Supporting of cables, hoses, or other tubular articles so as not to chafe against one another or against an external support. Such articles are supported spaced apart from one another so as to be free to swivel relative to one another in separate planes. A pair of saddle members are pivoted together and are provided with means to enable flexible tubular articles to be tied to the respective members in such swivelling relationship to each other.

17 Claims, 2 Drawing Sheets

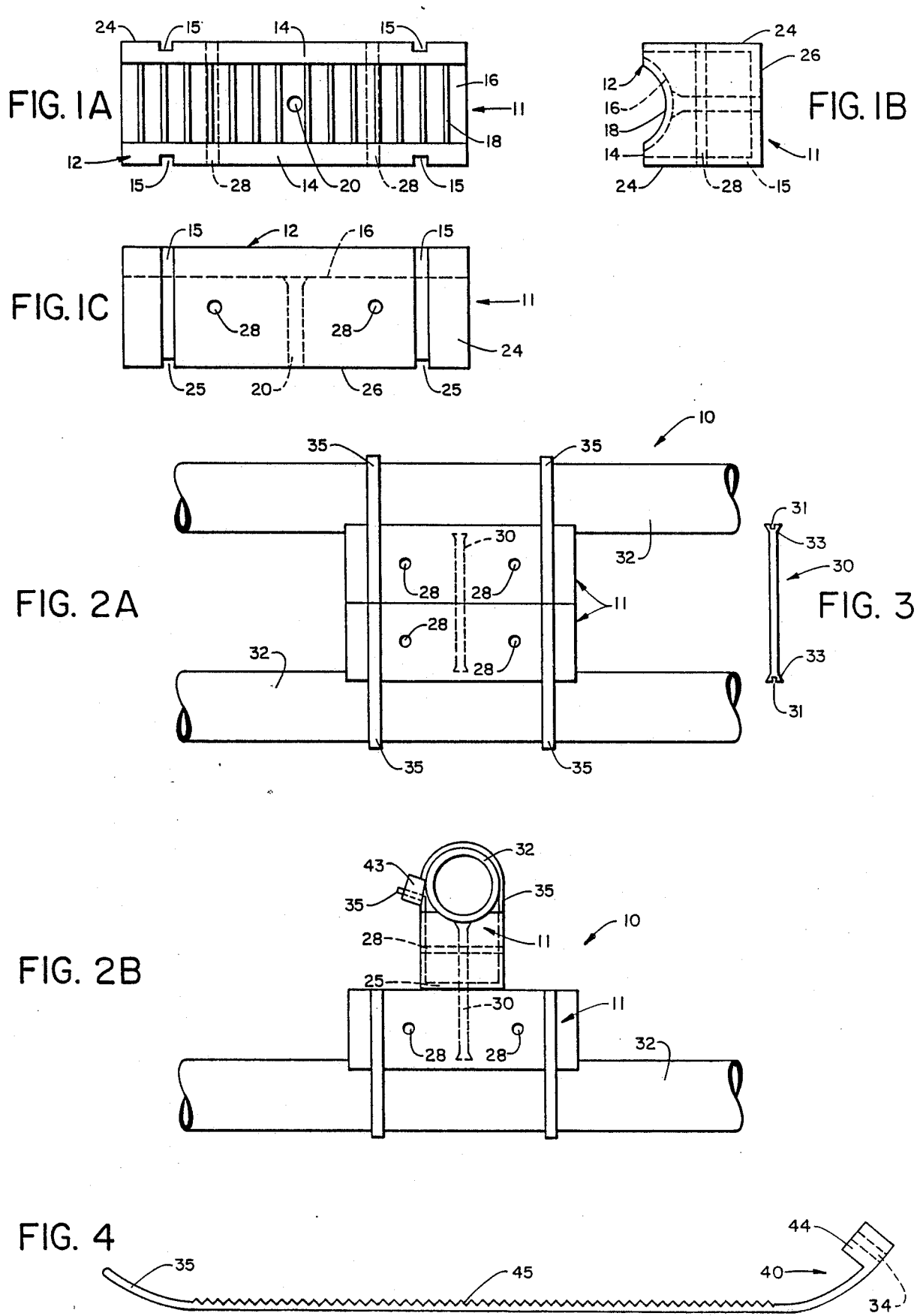

ANTI-CHAFE SUPPORTING OF FLEXIBLE TUBULAR ARTICLES

This is a continuation-in-part of my copending application of a somewhat similar title, Ser. No. 852,294 filed Apr. 15, 1986, which is abandoned.

FIELD OF THE INVENTION

This invention relates to clamplike supporting of cables or hoses or other flexible tubular articles in mutually non-chafing relationship, despite frequent and/or rapid repetitive movement relative to one another or to adjacent means, as in reciprocating machinery or under vibration from whatever source.

BACKGROUND OF THE INVENTION

Numerous methods and means are known for holding rigid tubular articles, such as pipes, fixed relative to a supporting surface or for holding more than one such tubular article fixed relative to another. Some such arrangements permit a limited amount of very gradual reorientation or "creep" as, for example, by spacers of stacked pipes in Warnock U.S. Pat. No. 2,977,405, and in Tunnessen U.S. Pat. No. 3,055,398. A pair of flexible tubular articles, such as hoses, may be held in fixed relationship, such as side-by-side, or in layered pairs, as disclosed in British Pat. No. 893,448.

Such arrangements are acceptable under fixed orientation, or under gradual reorientation, but much less than satisfactory where the supported articles move frequently and/or rapidly relative to one another and, in doing so, rub against the supporting means or each other. Examples of such unfavorable environments are found in reciprocating machinery, such as hydraulic or pneumatic lines on backhoes, jackhammers, trash pickup trucks, and vehicle steering mechanisms, and under conditions of vibration attributable to such machinery or to engines, high transport speeds, or other factors.

Chafing of pressurized lines against their clamping or other supporting means or against each other shortens the useful life of the lines themselves and poses not only an unnecessary risk of equipment damage and of excessive downtime or maintenance, but also an unacceptable hazard to the life and limb of users whenever resulting wear, induced or aggravated by chafing, causes such a line to burst while in use. Similarly induced excessive wear upon electrical cables is productive of arcing or grounding of power or scrambling of signals or data, with disastrous resulting effects, such as when in use on airplanes, bridges, oil rigs, ships, etc.

There is an urgent need for improved clamping methods and means to hold and support at least a pair of cables, hoses, or similar flexible tubular articles while enabling them to undergo frequent and/or rapid repetitive movement without chafing.

SUMMARY OF THE INVENTION

A primary object of the present invention is to support cables, hoses, and like flexible tubular articles in non-chafing relation to each other and to adjacent supporting means.

Another object of this invention is to lengthen the useful life of such flexible tubular articles subjected to frequent or rapid repetitive movement.

A further object of this invention is to reduce the risk of catastrophic failure of such articles to personnel and equipment.

Yet another object of this invention is to enable such articles to move frequently and/or rapidly in a limited manner relative to one another while so supported.

A still further object of the invention is to provide simple and economical methods and means to carry out the foregoing objects.

In general, the objects of this invention are accomplished by a method of supporting a plurality of cables, hoses, or similar flexible tubular articles spaced apart from and substantially parallel to one another, securing each and enabling them to swivel relative to one another while so supported.

The invention is conveniently practiced with anti-chafing supporting means for cables, hoses, or the like, comprising a pair of multi-sided saddle members, each having along one of its sides a flat face and having along an opposite side a cylindrically concave face to receive up to about half of the circumferential extent of such a flexible tubular article therein, tie means adapted to hold the respective tubular articles along and against the concave faces of the saddle members, and pivot means adapted to retain the saddle members together along such flat sides. Hence, the concave faces of the adjacent saddle members are spaced apart from one another and are thereby adapted to hold the supported articles spaced apart to avoid chafing contact with each other. Optional mounting means for such supporting means enables it to be affixed to an adjacent solid surface and to offset the supported articles therefrom so as not to chafe against such surface either, in the event of frequent and/or rapid movement relative to one another or to such surface.

Methods and means for attaining the foregoing objects and the other objects of this invention will be readily apparent from the following description and the accompanying diagrams of a preferred embodiment, presented by way of example rather than limitation.

BRIEF DESCRIPTION OF THE DRAWINGS

FIGS. 1A, 1B, and 1C show, in plan and in end elevation and side elevation, respectively, a supporting clamping member useful in the practice of this invention;

FIGS. 2A and 2B show supporting clamping means useful according to the invention in two different side elevations, with flexible tubular articles assembled thereto in both instances, first in a mutually parallel, then in a mutually perpendicular, orientation;

FIG. 3 shows a pivot pin of the same supporting clamp assembly in side elevation;

FIG. 4 shows a tie member of the same supporting clamp assembly in side elevation.

DETAILED DESCRIPTION OF THE INVENTION

Figure 5:
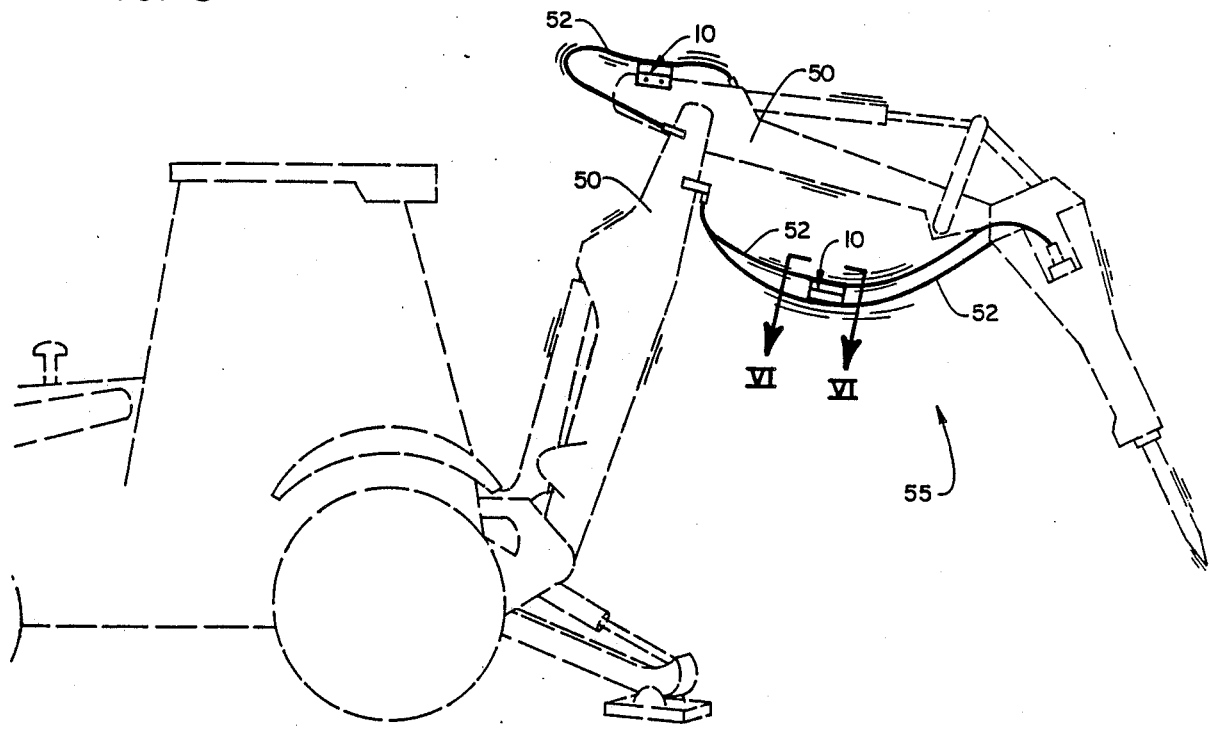
FIGS. 5 and 6 show fragmentarily in front and side elevation, respectively, machinery utilizing supporting clamping means of the foregoing views.

Multi-sided clamping member 11 of the supporting clamping means of this invention appears in plan in FIG. 1A, in end elevation in FIG. 1B (to the right of FIG. 1A), and in side elevation in FIG. 1C.

Visible top side 12 of clamping member 11 has a pair of narrow coplanar lateral striplike surfaces 14 extending along its opposite long edges and has intervening saddle-like cylindrically concave surface 16. Such surface has circumferentially transverse ridges or serrations 18 extending thereacross between the narrow flat surfaces. Central bore 20 for a pivot pin (not shown here) is visible in FIG. 1A flanked by the two centermost serrations. The central bore 20 is seen in FIGS. 1B and 1C to extend from top face 12 to flat opposite side or bottom surface 26 of clamping member 11 and to be flared at each end.

Along each side surface 24 of clamping member 11, a pair of lateral recesses 15 extend from top side 12 to bottom side 26, where spaced transverse bottom recesses 25 join the respective opposing lateral recesses and extends across the bottom surface. A pair of transverse bores 28 for bolts, screws or similar mounting means (not shown) extend through the clamping member from side to side at locations about midway from top and bottom and midway between the central bore and each end.

It will be understood that a plurality of the illustrated clamping members are assembled in given relationship to support cables, hoses, or the like. The next several views show other components and the resulting assembly.

FIG. 2A shows clamping means 10 of this invention assembled from a pair of clamping members 11, one upright as in FIG. 1C and one inverted, with their flat bottom surfaces mutually adjacent and, in fact, contiguous. They are held together by pivot pin 30 (broken lines) in central bore 20 (not separately shown) of each. The cylindrically concave faces of the respective clamping members have juxtaposed thereto respective flexible tubular articles 32, each of which is retained along and against such surface by a pair of flexible tie members extending within the bottom and lateral recesses and about somewhat less than the complete outer half of the circumferential surface of such tubular article. So supported, the articles are mutually parallel in the plane of the view, as well as in planes (from side to side) perpendicular to the view.

FIG. 2B is similar to FIG. 2A except that one of the clamping members has been pivoted about pin 30 through a right angle relative to the other clamping member to relocate the cylindrical articles mutually perpendicular in the plane of this view instead of parallel as before—although they remain in parallel planes perpendicular to the view. Visible at the left of the supported article is head 44 of tie means 40, which is shown in greater detail in FIG. 4.

FIG. 3 shows double-headed pivot pin 30, which fits into the vertical central bores and is secured therein by headed ends 33 to retain the clamping members together. Slot 31 in each head enables it to be compressed enough to enter the bore and expand thereafter. Although shown separately here for convenience, such pin (or an equivalent) may be preassembled to a clamping member or be formed integrally therewith, for insertion into the central bore of a pinless clamping member during assembly of the clamping means. The head(s) of the pivot pin may be present or absent during insertion of the pin in the central bore(s); in the former instance such a head may be compressed temporarily for such insertion, whereas in the latter instance it may be be formed (as by swaging) after it is in place.

FIG. 4 shows separately flexible tie means 40, which has head 42 in the general shape of a cube. The head has joined to it at one corner elongated tie strip 35, which has serrated surface 45 on one side. The head also has slot 34 therethrough perpendicular to the tie strip at such junction to the head, to receive strip 35. The design and operation of such a flexible tie device are well known. Equivalent tying or similar securing means may be substituted for this preferred arrangement, which has the undeniable advantages of simplicity of assembly—and dissassembly whenever desired.

Assembly and operation of the described supporting clamping assembly will be readily understood in the light of the diagrams, their foregoing description, and the following explanatory comments.

With a retaining pin preassembled to (or integral with) one of the clamping members, the user juxtaposes the cylindrically concave face of the clamping member to a first flexible tubular article to be supported and wraps a first flexible tie strip around the bottom and sides of the clamping member, taking care to see that it lies in the recesses provided, especially across the bottom surface—as two such surfaces will adjoin. After wrapping the tie strip also about the exposed circumferential surface of the tubular article, the user secures it tightly, which with the illustrated type of tie device is accomplished by inserting the free end of the strip into and through the slot in the head end and pulling the strip as far as possible therethrough. When the tie is tight, the protruding part may be snipped off, as the serrations on the flexible strip portion will hold it securely together. The user then applies another tie similarly near the other end of the clamping member.

The user also assembles a clamping member (less retaining pin) to another flexible tubular article close by the first and ties them together in like manner. Then the pin protruding from the first clamping member is inserted (under compression, if necessary) into the bottom end of the central bore of the second such member, and the respective clamping members are pressed together sufficiently to insert the pin far enough to locate its head within the tapered entrance at the opposite end of the bore. If compressed, the head is allowed to expand into place therein and thereby retain the clamping members together. If necessary the head of the pin can be swaged to broaden it and thereby secure the respective clamping members together. This completes the assembly.

It will be understood that either clamping member can swivel frequently and rapidly, if need be, relative to the other member about the retaining pivot pin. This enables the assembled clamping means to accommodate flexing, vibration, or similarly frequent or rapid repetitive change in position of the supported cables, hoses, or like tubular articles. The serrations on the saddle-like concave faces inhibit the supported articles from creeping therealong, as might occasion undesirable constraint or stretching of such article.

The clamping assembly can be disassembled, if desired, as by prying the clamping members apart to disengage the retaining pin. The clamped tubular articles can be separated readily by cutting the ties, whether the assembly is assembled or disassembled.

Figure 6:
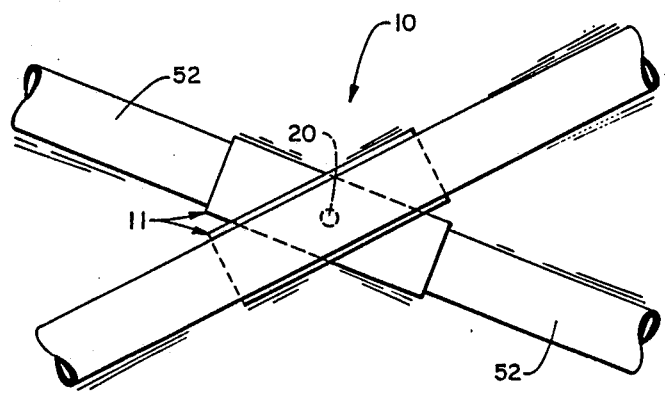

FIGS. 5 and 6 show the practice of this invention under an example of the kind of demanding conditions in which it answers an urgent need for anti-chafing mounting of high-pressure hoses.

FIG. 5 shows backbone apparatus 50 fragmentarily in broken lines, and a plurality of such supporting clamping assemblies 10 in solid lines carried directly or indirectly by such machinery. The backhoe machine carries at its right (rear) end a jackhammer extension that can be raised and lowered by raising and lowering of its support and can be tilted and be operated at the urging of hydraulic or pneumatic pressure, via a plurality of pressurized hoses 52. Included at the upper left is a single such hose 52 of the tilting mechanism, and at the right and lower a pair of such hoses in the jackhammer operating circuit. The first mentioned hose is carried in the saddle of the upper clamping member of a supporting assembly 10 of this invention, and the lower clamping member is bolted transversely to a frame member of the machine. The lower pair of hoses 52 are interposed in the intermediate or hanging portion of such hoses in the manner previously described, also shown in the next view.

FIG. 6 shows in plan supporting clamping assembly 10 of this invention with hoses 52 secured (by tie means not shown here) to respective clamping members 11 in separate planes and crossing in this view at an acute angle to one another about pivot pin 20, in swivelling relationship to one another. Vibratory or frequent movement relative to one another is suggested by the short lines alongside both hoses and the clamping members themselves.

Such hoses are subject to frequent repetitive movement and gravitational displacement as the jackhammer support is raised or lowered, and also are subject to vibration from the operation of the jackhammer and of an internal combustion engine (not shown) for the entire machine.

Some modifications in such clamping methods and means have been suggested above; others may be made, as by adding, deleting, combining, or subdividing parts or steps, while retaining at least some of the advantages and benefits of this invention, which itself is defined in the following claims.

I claim:

1. Method of supporting cables, hoses, or other flexible tubular articles in mutually anti-chafing relationship, comprising the steps of
   juxtaposing a plurality of such flexible tubular articles to respective cylindrically concave faces of supporting members spaced apart from and substantially parallel to one another,
   securing each such flexible tubular article in place along and against such face of the supporting member to which it was so juxtaposed by binding the article to the supporting member, and
   joining said supporting members, thereby enabling each secured tubular article and support member to swivel freely about an axis at any selected orientation relative to one another but only in separate mutually parallel planes of movement in non-chafing relationship.

2. Anti-chafing supporting method according to claim 1, including joining the respective supporting members together with suitable non-flexible spring-free pivot means.

3. Anti-chafing supporting method according to claim 2, wherein the respective supporting members are joined together by insertion of a rigid pivot pin thereinto substantially perpendicular to the planes of movement of the supported tubular articles.

4. Method of assembling anti-chafing supporting means for a given adjacent pair of cables, hoses, or like flexible tubular articles subject to frequent or rapid movement, regardless of the orientation of such adjacent articles to each other or to the ground, comprising the steps of
   providing a pair of saddle members each having a flat side and opposite each such flat side a cylindrically concave face facing away therefrom and adapted to receive part of the circumferential extent of such a cylindrical article therein,
   providing means adapted to hold such tubular articles along and against such concave faces,
   providing rigid pivot means adapted to be secured to such saddle members to retain them in swivelling relationship to one another with their respective flat sides mutually adjacent,
   juxtaposing such flat sides of the respective saddle members to one another and securing such saddle members together with such pivot means in swivelling relationship to one another.

5. Anti-chafing means assembled according to the method of claim 4.

6. Anti-chafing means assembly method according to claim 4,
   including providing tie means for securing such flexible tubular articles to the concave faces of the saddle members, and
   securing respective flexible tubular articles to the concave faces of the respective saddle members and away from one another.

7. Anti-chafing means assembly method according to claim 6, wherein such flexible tubular articles secured to the respective outwardly facing opposite concave faces of the saddle members are thereby enabled to swivel frequently and rapidly relative to one another only in parallel planes in non-chafing relationship to one another.

8. Anti-chafing means assembled according to the method of claim 5.

9. Anti-chafing supporting means for cables, hoses, or like flexible tubular articles subject to frequent or rapid movement, assembled according to claim 6 and comprising
   a pair of saddle members each having a flat side and opposite each such flat side a cylindrically concave face facing away therefrom and receiving part of the circumferential extent of such a cylindrical article therein,
   tie means holding a pair of such tubular articles along and against such respective concave faces, and
   pivot means secured to such saddle members and retaining them in swivelling relationship to one another with such respective flat sides mutually adjacent.

10. Anti-chafing supporting means according to claim 9, wherein the tie means is flexible, and such flat side of each saddle member is recessed to receive the tie means therein.

11. Anti-chafing support means according to claim 10, wherein the saddle members have two similarly recessed sides perpendicular to such flat side thereof.

12. Anti-chafing support means according to claim 9, wherein at least one of the saddle members is adapted by lateral boring to enable it to be secured laterally to external means by a suitable fastener.

13. Anti-chafing support means according to claim 12, wherein such saddle member has a plurality of lateral bores therethrough to receive fastening means.

14. Anti-chafing assembly method according to claim 6, wherein the last two recited steps are performed after the previously recited steps.

15. Anti-chafing assembly method according to claim 6, wherein the last two recited steps are performed before the previously recited steps.

16. Anti-chafing supporting means for an adjacent pair of cables, hoses, or like flexible tubular articles subject to frequent, rapid, repetitive, or vibratory movement, comprising a pair of saddle members each having a side and having opposite such side a cylindrically concave face facing away therefrom and adapted to receive part of the circumferential extent of such a cylindrical article thereagainst, tie means holding two such tubular articles respectively along and against such respective concave faces, and non-elastomeric spring-free pivot means
secured to such saddle members with their respective aforesaid sides mutually adjacent, and
retaining the saddle members in swivelling relationship about a given swivel axis relative to one another, regardless of the orientation of the articles relative to one another or to the ground.

17. Anti-chafing supporting means according to claim 16, wherein the mentioned sides of the respective saddle members are flat and mutually contiguous.

* * * * *